(No Model.)
J. VAN HOOGSTRATE.
TROLLEY FOR ELECTRIC RAILWAY CARS.
No. 566,252. Patented Aug. 18, 1896.
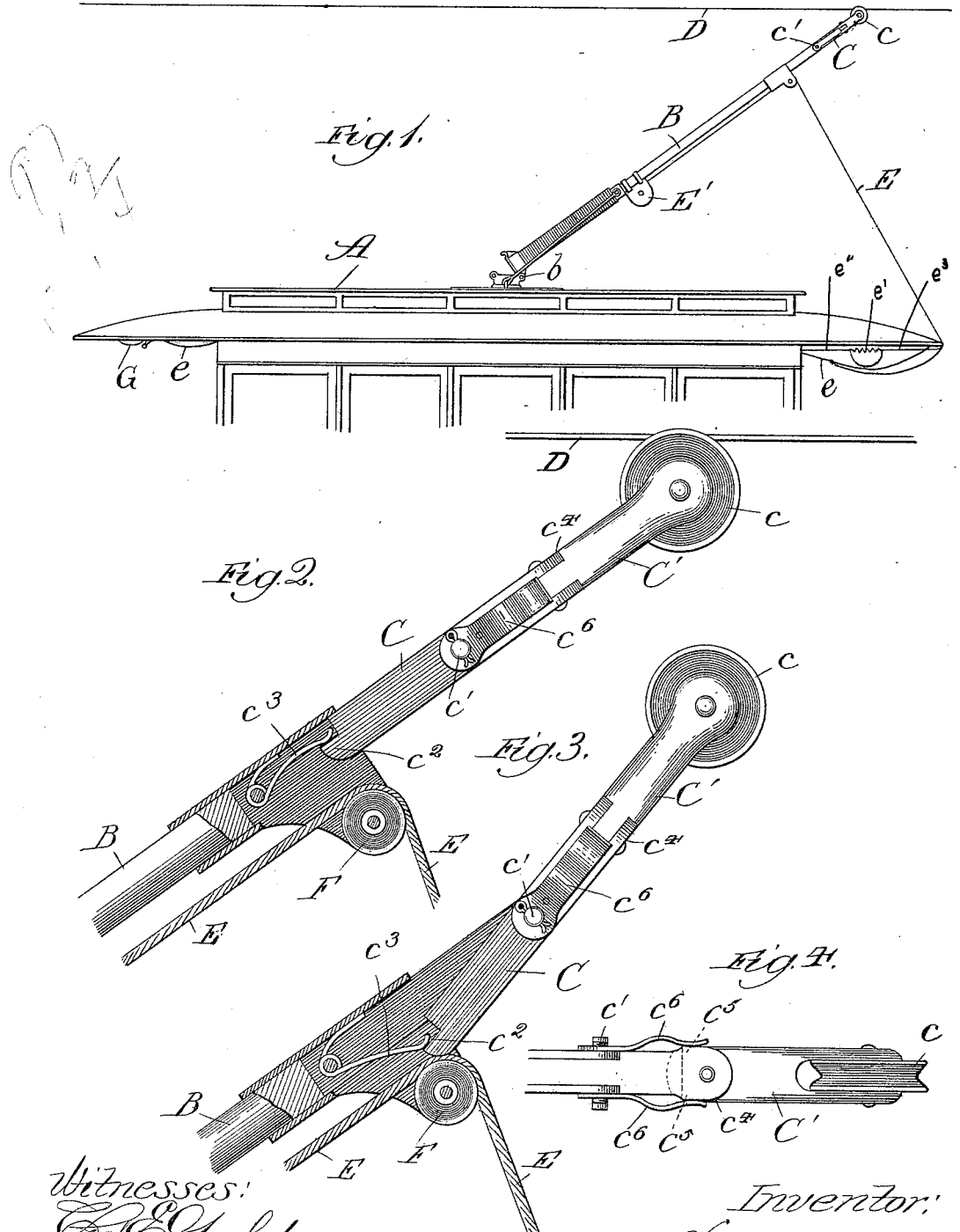

UNITED STATES PATENT OFFICE.

JOHN VAN HOOGSTRATE, OF CHICAGO, ILLINOIS, ASSIGNOR OF ONE-HALF TO ALBERT WAHL, OF SAME PLACE.

TROLLEY FOR ELECTRIC-RAILWAY CARS.

SPECIFICATION forming part of Letters Patent No. 566,252, dated August 18, 1896.

Application filed March 31, 1896. Serial No. 585,534. (No model.)

*To all whom it may concern:*

Be it known that I, JOHN VAN HOOGSTRATE, a citizen of the United States, residing at Chicago, Illinois, have invented certain new and useful Improvements in Trolleys for Electric-Railway Cars, of which the following is a specification.

The object of my invention is to provide a simple economical trolley and pole for electric-railway cars, and I so construct it as to efficiently take up the slack in the controlling-rope, prevent sudden upward motions of the pole, permit it to stay on the trolley-wire, and sound an alarm when the trolley "jumps" the wire; and the invention consists in the features, combinations, and details of construction hereinafter described and claimed.

In the accompanying drawings, Figure 1 is a broken side elevation of the top of a car, showing my improved mechanism in position for use; Fig. 2, an enlarged side elevation of the upper portion of the pole, trolley, and controlling mechanism; Fig. 3, a similar elevation showing the trolley when overhead pressure is removed, and Fig. 4 a plan view of the upper portion of the pole.

In the art to which this invention relates it is well known that the height of the trolley wire or wires varies, so that at times there is considerable slack in the controlling-rope, or the controlling-rope, if secured to the body of the car, is not long enough to permit the trolley to reach the wire. Again, it is well known that if the trolley slips or misses the wire in taking a turn or switch the pole will immediately swing upward, to the danger of destroying the span-wires. Further, it is well known that in turning a curve or taking a switch the trolley often jumps the wire, for the reason that the trolleys and poles as now constructed are not adapted for such purposes. The object of my invention, therefore, is principally to provide a trolley and pole that obviates these objections, in that the trolley is permitted to contact the wire at varying distances, is prevented from sudden rising, and is adapted to take curves, irregularities, or switches without danger of turning the wire.

In constructing my improvement I use a car A of any ordinary construction and provide it with a trolley-pole B, flexibly secured to the top of the car at $b$ in any ordinary or usual manner. In order to hold the pole with its trolley conveniently and prevent sudden rising, I pivot the portion C, that carries the trolley-wheel $c$, to the upper portion of the main pole at $c'$, so that the pole is what might be termed a "flexible" pole and occupies practically a straight plane when the trolley-wheel is in contact with the trolley-wire D.

To secure and control the movements of the trolley and pole, I provide a controlling-rope E and secure it to the pole by means of a spring-pulley in a box E', which is adapted to take up the slack of the rope at all times. The rope is then passed over an idler-pulley F, that is secured to the pole at a point adjacent to where the upper portion is pivoted in such manner that when the trolley slips or jumps the wire the inner free end $c^2$ of the flexible portion of the pole is forced outwardly by the action of a spring $c^3$, so as to grip the controlling-rope firmly between it and the idler-pulley and prevent any further upward motion of the trolley and pole. By this means it will be seen that the trolley can easily swing into position to again "catch" the wire and prevent it from contacting or hitting the span or supporting wires.

In order to permit the trolley to contact the trolley-wire at all times—either when the car is taking a switch or turning a curve—I prefer to make the part C' of the flexible portion of the trolley-pole in the form of a swivel-joint, as at $c^4$, providing its lower portion, as at $c^5$, with flat surfaces arranged to be contacted by springs $c^6$, that are secured to the flexible portion, so as to normally keep the entire pole in a straight line when extraneous force is removed. It will be seen, however, that as the car varies in its relative position to the trolley-wire this upper portion can "flex" or swing to compensate for such various motions in the car and at the same time return to its normal straight position when the movement of the car and the length of the trolley-wire coincide.

It is often desirable and necessary that the motorman should be warned of the fact that the trolley has jumped the wire, so as to enable him to stop the car at dangerous crossings; otherwise the car might continue its motion and stop in a position that would be liable to cause dangerous accidents. To accomplish this result, the trolley-pole is provided with the controlling-rope E, which is known in the art as a "tight rope"—viz., a rope in which the slack, or substantially all the slack, is taken up. The lower end of this rope is secured to a bell-rope $e$, so that if the trolley jumps the wire this bell-rope is immediately pulled, sounding the bell G, that is immediately over the motorman. In order to prevent the tight rope from holding the clapper normally against the bell, I use a coil-spring $e'$ and provide it with a rope $e^2$, which is secured rigidly to the body of the car, the other end, $e^3$, being secured to the tight rope. This spring $e'$ is of a little greater—or about the same—tension as the spring in the box E', so that it allows the lower end of the tight rope, between where the rope $e^3$ connects with it and where the tight rope connects with the ordinary bell-rope, to be slack, thus allowing the bell to remain in position to be rung. When the trolley jumps the wire, the sudden pull stretches the coil-spring $e'$ sufficient to pull the bell-rope and ring the bell. This bell may be located at any convenient point and any suitable means other than those described may be used for sounding the alarm when the trolley jumps the wire without departing from the spirit of my invention.

While I have described my invention with more or less minuteness and as being embodied in precise forms, I do not desire to be limited thereto unduly any more than is pointed out in the claims. On the contrary, I contemplate all proper changes in form, construction, and arrangement, the omission of immaterial parts, and the substitution of equivalents, as circumstances may suggest or necessity render expedient.

I claim—

1. A trolley-pole comprising a main portion, an upper flexible portion carrying the trolley-wheel, a controlling-rope having one end secured to the trolley-pole and the other to the car-body, and supplemental means on the trolley-pole for grasping the controlling-rope to prevent upward rising of the pole when overhead pressure is removed or the trolley released from the wire, substantially as described.

2. A trolley-pole comprising a main portion, an upper flexible portion, a controlling-rope arranged thereon so as to be automatically grasped between such portions when overhead pressure is removed and prevent rising of the pole beyond a predetermined position, substantially as described.

3. A trolley-pole comprising a main portion, an upper portion pivoted thereto carrying a trolley-wheel at its upper free end, an idler-pulley on the main portion, and a controlling-rope passed over such idler-pulley and arranged to be grasped between the flexible portion of the pole and the idler-pulley when overhead pressure is removed to prevent rising of the pole beyond a predetermined position, substantially as described.

4. A trolley-pole comprising a main portion, an upper portion pivoted thereto carrying a trolley-wheel at its upper free end, an idler-pulley on the main portion, a controlling-rope passed over such idler-pulley and arranged to be grasped between the lower free end of the pivoted portion of the pole, and spring mechanism for automatically operating the pivoted portion of the trolley-pole to grasp the controlling-rope, substantially as described.

5. A trolley-pole comprising a main portion, an upper portion pivoted thereto so as to have upward and downward extending free ends, the upper free end provided with a knuckle-joint and carrying the trolley-wheel to permit lateral movement of the main portion and allow the trolley-wheel to stay on the trolley-wire, spring mechanism for holding the parts normally in alinement, an idler-pulley secured to the main portion, a controlling-rope passed over such idler-pulley and arranged to be grasped by the lower free end of the pivoted portion and the idler-wheel to prevent upward motion of the pole beyond a predetermined point when overhead pressure is removed, and spring mechanism for automatically operating the pivoted portion of the pole to grasp the rod when overhead pressure is removed, substantially as described.

6. In trolley-poles for electric cars, the combination of a trolley-pole carrying a tight controlling-rope, a controlling-rope arranged thereon, and a bell arranged on the car and adapted to be sounded when the trolley-pole reaches an upper predetermined limit of motion, substantially as described.

JOHN VAN HOOGSTRATE.

Witnesses:
THOMAS F. SHERIDAN,
ALBERT WAHL.